(12) United States Patent
Fleizach et al.

(10) Patent No.: US 9,305,543 B2
(45) Date of Patent: Apr. 5, 2016

(54) INTELLIGENT TEXT-TO-SPEECH CONVERSION

(71) Applicant: Apple Inc., Cupertino, CA (US)

(72) Inventors: Christopher Brian Fleizach, Morgan Hill, CA (US); Reginald Dean Hudson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/631,526

(22) Filed: Feb. 25, 2015

(65) Prior Publication Data

US 2015/0170635 A1 Jun. 18, 2015

Related U.S. Application Data

(63) Continuation of application No. 12/098,417, filed on Apr. 5, 2008, now Pat. No. 8,996,376.

(51) Int. Cl.
*G10L 13/00* (2006.01)
*G10L 13/04* (2013.01)
*G06F 17/27* (2006.01)

(52) U.S. Cl.
CPC ............ *G10L 13/00* (2013.01); *G06F 17/2705* (2013.01); *G10L 13/043* (2013.01)

(58) Field of Classification Search
CPC ..... G10L 13/043; G10L 15/22; G10L 13/033; G10L 13/08; G10L 13/10; G06F 17/30011; G06F 17/30684; G06F 17/241; G06F 17/2705; G06F 17/30672; G06F 17/30905
USPC ............ 381/56, 320; 715/239, 854, 763, 716, 715/200; 704/260, 9, 270.1, 243, 235, 208; 707/999.003; 709/206, 219; 700/94; 379/257; 365/232, 231; 713/219; 705/17; 434/317; 370/311; 345/173
See application file for complete search history.

(56) References Cited

U.S. PATENT DOCUMENTS

| | | | | |
|---|---|---|---|---|
| 5,555,343 A * | 9/1996 | Luther | ............ | G10L 13/08 704/258 |
| 6,070,138 A * | 5/2000 | Iwata | ............ | G10L 13/00 704/260 |
| 6,622,121 B1 * | 9/2003 | Crepy | ............ | G10L 15/01 704/243 |
| 6,933,928 B1 * | 8/2005 | Lilienthal | ............ | G06F 15/0283 345/156 |
| 7,100,117 B1 * | 8/2006 | Chwa | ............ | H04N 21/235 375/E7.024 |
| 7,185,276 B2 * | 2/2007 | Keswa | ............ | H04L 63/08 707/999.001 |
| 7,596,606 B2 * | 9/2009 | Codignotto | ............ | G06Q 10/107 379/67.1 |
| 7,640,158 B2 * | 12/2009 | Detlef | ............ | G10L 15/26 704/235 |
| 7,693,717 B2 * | 4/2010 | Kahn | ............ | G10L 15/22 704/260 |
| 7,724,696 B1 * | 5/2010 | Parekh | ............ | G06F 1/3203 345/104 |
| 8,713,418 B2 * | 4/2014 | King | ............ | G06F 17/3089 715/200 |

(Continued)

*Primary Examiner* — Michael Colucci
(74) *Attorney, Agent, or Firm* — Morrison & Foerster LLP

(57) ABSTRACT

Techniques for improved text-to-speech processing are disclosed. The improved text-to-speech processing can convert text from an electronic document into an audio output that includes speech associated with the text as well as audio contextual cues. One aspect provides audio contextual cues to the listener when outputting speech (spoken text) pertaining to a document. The audio contextual cues can be based on an analysis of a document prior to a text-to-speech conversion. Another aspect can produce an audio summary for a file. The audio summary for a document can thereafter be presented to a user so that the user can hear a summary of the document without having to process the document to produce its spoken text via text-to-speech conversion.

25 Claims, 12 Drawing Sheets

(56) References Cited

U.S. PATENT DOCUMENTS

| | | | |
|---|---|---|---|
| 2002/0002461 A1* | 1/2002 | Tetsumoto | G10L 13/08 704/270.1 |
| 2002/0073177 A1* | 6/2002 | Clark | G06F 21/10 709/219 |
| 2002/0110248 A1* | 8/2002 | Kovales | G10L 13/00 381/56 |
| 2003/0009459 A1* | 1/2003 | Chastain | G06F 17/241 |
| 2003/0078766 A1* | 4/2003 | Appelt | G06F 17/30616 704/9 |
| 2003/0194080 A1* | 10/2003 | Michaelis | H04M 3/42153 379/257 |
| 2003/0200452 A1* | 10/2003 | Tagawa | G06F 3/16 713/193 |
| 2005/0055212 A1* | 3/2005 | Nagao | G10L 13/00 704/270.1 |
| 2005/0094475 A1* | 5/2005 | Naoi | G10L 13/00 365/232 |
| 2005/0222973 A1* | 10/2005 | Kaiser | G06F 17/30011 |
| 2006/0041590 A1* | 2/2006 | King | G06F 17/30011 |
| 2006/0095848 A1* | 5/2006 | Naik | G06F 9/4443 715/716 |
| 2007/0112562 A1* | 5/2007 | Vainio | G11B 27/105 704/208 |
| 2007/0118378 A1* | 5/2007 | Skuratovsky | G10L 13/033 704/260 |
| 2007/0230729 A1* | 10/2007 | Naylor | H04R 25/407 381/320 |
| 2007/0244702 A1* | 10/2007 | Kahn | G10L 15/22 704/260 |
| 2008/0119953 A1* | 5/2008 | Reed | G06F 17/30017 700/94 |
| 2008/0120196 A1* | 5/2008 | Reed | G06F 17/30017 705/17 |
| 2008/0120311 A1* | 5/2008 | Reed | G06F 17/30017 |
| 2008/0120312 A1* | 5/2008 | Reed | G06F 17/30017 |
| 2008/0120330 A1* | 5/2008 | Reed | G06F 17/30017 |
| 2008/0120342 A1* | 5/2008 | Reed | G06F 17/30017 |
| 2008/0124695 A1* | 5/2008 | Myers | G09B 5/062 434/317 |
| 2008/0140702 A1* | 6/2008 | Reed | G06F 17/30017 |
| 2008/0141180 A1* | 6/2008 | Reed | G06F 17/30017 715/854 |
| 2009/0187577 A1* | 7/2009 | Reznik | G06F 17/3089 |
| 2009/0248182 A1* | 10/2009 | Logan | G06F 17/30053 700/94 |
| 2009/0254345 A1* | 10/2009 | Fleizach | G10L 13/043 704/260 |

* cited by examiner

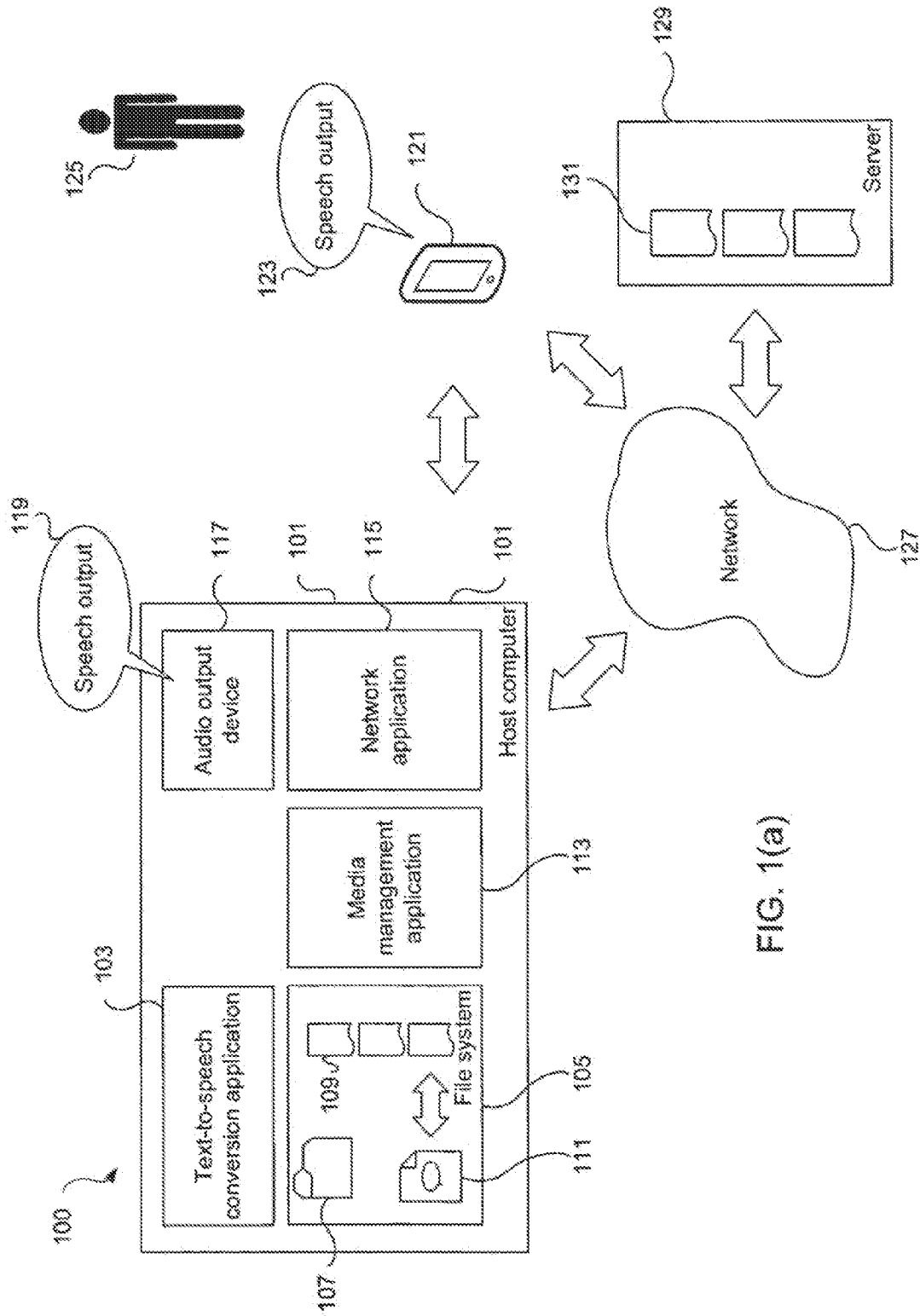

ent; determining which of the identified text elements will be spoken; determining an order in which the identified text elements will be spoken; determining at least one audio cue that will accompany the at least one of the spoken text elements; and associating the at least one determined audio cue with the at least one of the spoken text elements corresponding thereto.

As a computer implemented method for generating an audio summary for a document, one embodiment of the invention can, for example, include at least: parsing a document; generating an audio summary for the parsed document; and associating the audio summary to the parsed document.

As a method for presenting a text-based document in an audio fashion, one embodiment of the invention can, for example, include at least: providing a text document having at plurality of embedded text-to-speech markup tags; and converting the text document to an audio file using text-to-speech conversion and using the embedded text-to-speech tags.

As a text-to-speech conversion system, one embodiment of the invention can, for example, include at least: a text document having at plurality of embedded text-to-speech markup tags; and a text-to-speech converter configured to convert the text document to an audio file in accordance with the embedded text-to-speech tags.

As a computer readable storage medium including at least computer program code for converting text to speech tangibly embodied therein, one embodiment can, for example, include at least: computer program code for selecting a document to be converted to speech; computer program code for parsing the selected document; computer program code for converting text in the selected document to speech; and computer program code for creating an audio file based on the converted text, where the audio file includes at least one audio cue.

Other aspects and advantages of the invention will become apparent from the following detailed description taken in conjunction with the accompanying drawings which illustrate, by way of example, the principles of the invention.

INTELLIGENT TEXT-TO-SPEECH CONVERSION

CROSS REFERENCE TO RELATED APPLICATION

This application is a continuation of U.S. Patent application ser. no. 12/098,417, filed Apr. 5, 2008, entitled INTELLIGENT TEXT-TO-SPEECH CONVERSION, which is hereby incorporated by reference in its entirety for all purposes.

BACKGROUND OF THE INVENTION

1. Field of the Invention

The invention pertains to text-to-speech processing and, more particularly, to enhanced text-to-speech processing for improved document review.

2. Description of the Related Art

For various reasons, documents have been converted to speech (spoken text) using conventional text-to-speech processing. A user desiring to review a document can then listen to the resulting speech instead of having to read through the document. For users with impaired vision, listening to the resulting speech for a document is particularly important. Regardless of the reasons for listening to speech associated with a document, conventional text-to-speech processing is often not able to impart to the user (listener) contextual information about the text that is being spoken. Further, in recent years, documents have become more complex and more diversified. As a result, today's documents can have many different formats and contain various different document elements, including links, images, headings, tables, captions, footnotes, etc., which makes text-to-speech processing more challenging. Thus, there is a need to provide improved text-to-speech processing that can present contextual information to listeners.

For users desiring to listen to documents while on-the-go, text-to-speech processing can generate audio output that can be listened to while on-the-go. However, text-to-speech processing is processor-intensive, making it impractical for many portable devices that have limited processing power. Hence, there is also a need to manage creation, delivery and consumption of audio outputs that provide speech associated with documents.

SUMMARY OF THE INVENTION

The invention pertains for techniques for improved text-to-speech processing. The improved text-to-speech processing can convert text from an electronic document into an audio output that includes speech associated with the text as well as audio contextual cues.

The invention can be implemented in numerous ways, including as a method, system, device, or apparatus (including a computer readable medium or a graphical user interface). Several embodiments of the invention are discussed below.

As a computer-implemented method for converting text to speech, one embodiment of the invention can, for example, include at least: selecting a document to be converted to speech; parsing the selected document; converting text in the selected document to speech; and creating an audio file based on the converted text.

As a computer-implemented method for converting text to speech, another embodiment of the invention can, for example, include at least: identifying text elements in a document;

BRIEF DESCRIPTION OF THE DRAWINGS

The invention will be readily understood by the following detailed description in conjunction with the accompanying drawings, wherein like reference numerals designate like structural elements, and in which:

FIG. 1(a) is a block diagram of a text-to-speech processing system according to one embodiment of the invention.

DETAILED DESCRIPTION OF THE INVENTION

Figure 1B:
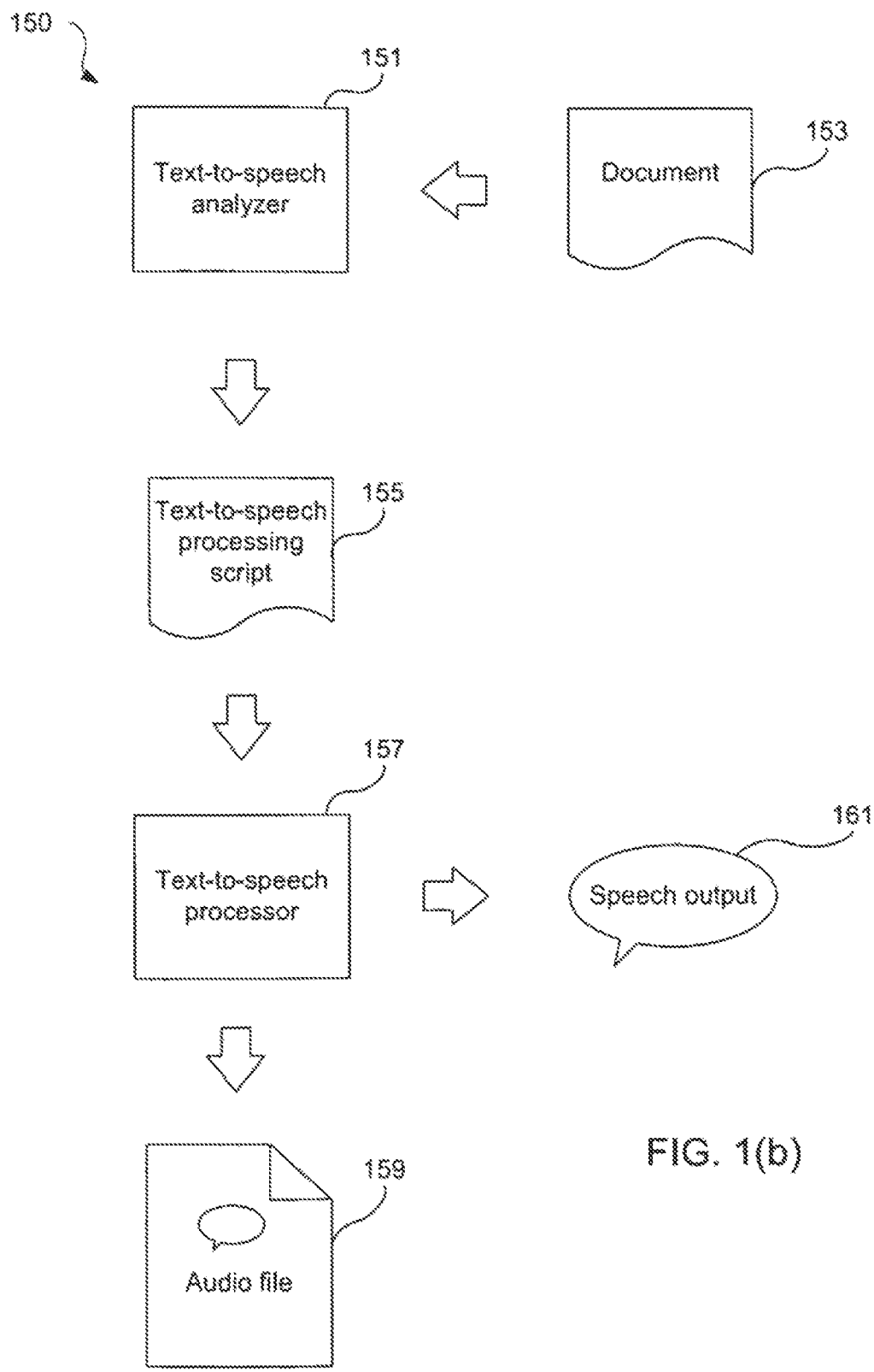
FIG. 1(b) is a block diagram of a text-to-speech processing system according to another embodiment of the invention.

The invention pertains for techniques for improved text-to-speech processing. The improved text-to-speech processing can convert text from an electronic document into an audio output that includes speech associated with the text as well as audio contextual cues.

One aspect of the invention provides audio contextual cues to the listener when outputting speech (spoken text) pertaining to a document. The audio contextual cues can be based on an analysis of a document prior to a text-to-speech conversion. In one embodiment, audio contextual cues can announce the context of a particular block of text, for example by saying "this is a title", "this is a footnote", etc. In other embodiment, audio contextual cues for the content of a document can also be imparted, for example, by any of: altering speed of the text as it is read, changing a voice used by the text-to-speech processor, playing a sound to announce a contextual change, speaking text while a background noise is played, changing the pitch of the voice speaking the text, playing a sound to indicate italicized or bolded text, playing a sound to indicate a misspelling or grammatical mistake, or altering volume of the voice speaking the text.

In one embodiment, the invention can process hyperlinks in a document in an intelligent manner. In one implementation, when a block of text includes a hyperlink, a text-to-speech processor can indicate (e.g., by auditory cue) to the user that a string of text (possibly a word or phrase) is a hyperlink. As one example, a low tone in the background can be played while a text-to-speech processor speaks the hyperlink. As another example, a tone or click can be played before and/or after the hyperlink. As still another example, a text-to-speech processor can use a distinct voice to let the user know that text being read is a hyperlink.

In one embodiment, audio contextual clues can be influenced by user preferences. Audio contextual cues can be, for example, set as user preferences in a software control panel associated with a text-to-speech processor.

According to another aspect of the invention, an audio summary can be generated for a file. The audio summary for a document can thereafter be presented to a user so that the user can hear a summary of the document without having to process the document to produce its spoken text via text-to-speech conversion.

Documents as used herein pertain to electronic documents. The electronic documents are electrically stored in an electronic file on a computer readable medium. For example, a document used herein can be of various different types and formats, including documents concerning text, word processing, presentation, webpage, electronic mail (e-mail), markup language, syndication, page description language, portable document format, etc.

Embodiments of the invention are discussed below with reference to FIGS. 1-9(b). However, those skilled in the art will readily appreciate that the detailed description given herein with respect to these figures is for explanatory purposes as the invention extends beyond these limited embodiments.

FIG. 1(a) is a block diagram of a text-to-speech processing system 100 according to one embodiment of the invention. The text-to-speech processing system 100 includes a host computer 101, a portable media player 121, and a server computer 129. The host computer 101 can be connected to the portable media player 121, for example, by using a USB cable or other cable, or by using a wireless network connection such as WiFi or Bluetooth. The host computer 101 can connect to the server computer 129 over a network 127, for example the Internet. The host computer 101 can be connected to the network either by a cable, for example an Ethernet cable, or by using a wireless network connection. The host computer 101 can include a file system 105, which is used to access files 109 and directories 107 on the host computer 101.

The host computer 101 can also include one or more software applications, for example a media management application 113, a network application 115, and a text-to-speech conversion application 103 (or text-to-speech converter). The media management application 113 can be, for example iTunes™ software program, produced by Apple Inc. of Cupertino, Calif. The media management application 113 can be used to organize and present (e.g., play) media files 111. Media files 111 can include audio files such as MP3s, AACs or RSS feeds, video files, and any other media content file. The media management application 113 can also be used to manage the transfer of audio files 111 between the host computer 101 and the portable media player 121, for example by performing a synching operation between the host computer 101 and the portable media player 121. For ease of use on the portable media player 121, the audio files 111 can be stored in a predetermined organization. The predetermined organization can facilitate searching, navigation and/or playback of the audio files 111 on the portable media player 121. For example, like types of documents (e.g., emails, webpages, etc.) can be separately grouped. The network application 115 can include any of a wide variety of network capable applications including, but not limited to, Web browsers, e-mail applications, and terminal applications. Also, the network application 115 can be implemented as a module or part of the media management application 113.

The text-to-speech conversion application 103 can be used to convert electronic documents (e.g., text files) into audio files 111. Alternately, the text-to-speech conversion application 103 can be used generate speech output 119 (e.g., by using a speech synthesizer). The generated speech output 119 can be presented to a user 125 using an audio output device 117. The audio output device 117 can be a sound card, for example, or other built-in sound hardware such as an audio output device built into a motherboard. Speech output 119 can be presented to the user 125 by way of a speaker or headphones, for example. The text-to-speech conversion application 103 can interact with a network application to present a webpage or the contents of an e-mail mailbox to the user 125. In one embodiment, the text-to-speech conversion application 103 can be used to convert documents, including webpages, RSS feeds, e-mails, text files, PDFs, or other documents having text into audio files 111 at the host computer 101. The text-to-speech conversion application 103 can also be used to produce files 131 that reside on the server computer 129. The files 131 that reside on the server computer can include audio files as well as any of the documents mentioned above. The audio files 111 can, in one embodiment, be copied from the host computer 101 to the portable media player 121. Further, the portable media player 121 can be capable of presenting speech output 123 to the user 125.

FIG. 1(b) is a block diagram of a text-to-speech processing system 150 according to one embodiment of the invention. The text-to-speech processing system 150 can be, for example, implemented by the text-to-speech conversion application 103 of FIG. 1(a).

The text-to-speech processing system 150 can include a text-to-speech analyzer 151. The text-to-speech analyzer 151 can analyze a document 153 and output a text-to-speech processing script 155. The document text-to-speech analyzer 151 can, for example, identify different elements of the document 153, such as the table of contents, publishing information, footnotes, endnotes, tables, figures, embedded video or audio, document abstract, hyperlinks, proprietary elements (e.g., such as Adobe Flash content or Apple QuickTime™ content), and document meta-information. The text-to-speech processing script 155 can then be created by the text-to-speech analyzer 151 with embedded audio context cues to be interpreted by a text-to-speech processor 157.

In one embodiment, the content of a document 153 to be converted to speech can be rearranged in the text-to-speech processing script 155 according to user preferences. For example, footnotes in the document 153 can be marked to be read in-line rather than at the bottom of the page, page numbers can be announced at the start of the page rather than at the end, a table of contents can be moved or omitted entirely, etc. The text-to-speech processor 157 can output an audio file 159 or can output speech 161 directly.

In one embodiment, in the case where the text-to-speech processor 157 output is converted into an audio file 159, audio chapter information can be inserted into the text-to-speech processing script 155 for conversion into chapter or track markers within the audio file (e.g., so a user can navigate within the audio file by skipping forward or backward by chapter).

The document text-to-speech processing script 155 can be stored for later use. For example, the document text-to-speech script 155 can be stored in a header of a file, in the directory that contains the file, or in some other linked file. In one embodiment, the document text-to-speech analyzer 151 can resolve hyperlinks, either for immediate processing or for later use. In this case, a user can set a preference instructing the document text-to-speech analyzer 151 how to resolve hyperlinks (e.g., how many levels of hyperlinks to resolve). Thus, references cited to within a document, for example in footnotes or endnotes, can be processed as well and inserted into the audio file 159 by the text-to-speech processor 157.

In one embodiment, a text-to-speech processing script 155 can be embedded in a document upon creation of the document, with the assumption that some users will want to have the document read to them rather than reading it themselves. Alternatively, a standardized markup language (e.g., a "text-to-speech markup language") can be used during creation of a document, in order to allow the creator of the document to exercise creative control over future text-to-speech conversions. For example, a creator (author) of a document can, in advance, pick the voice that a text-to-speech processor will use to read a document. In another example, a creator can pre-select voices for the dialogue of characters in a document, such as a book. In a third example, a webmaster seeking to design a webpage accessible to the visually impaired can incorporate commands to be processed by a text-to-speech processor, rather than relying on a document text-to-speech analyzer to correctly interpret his webpage design.

Figure 1C:
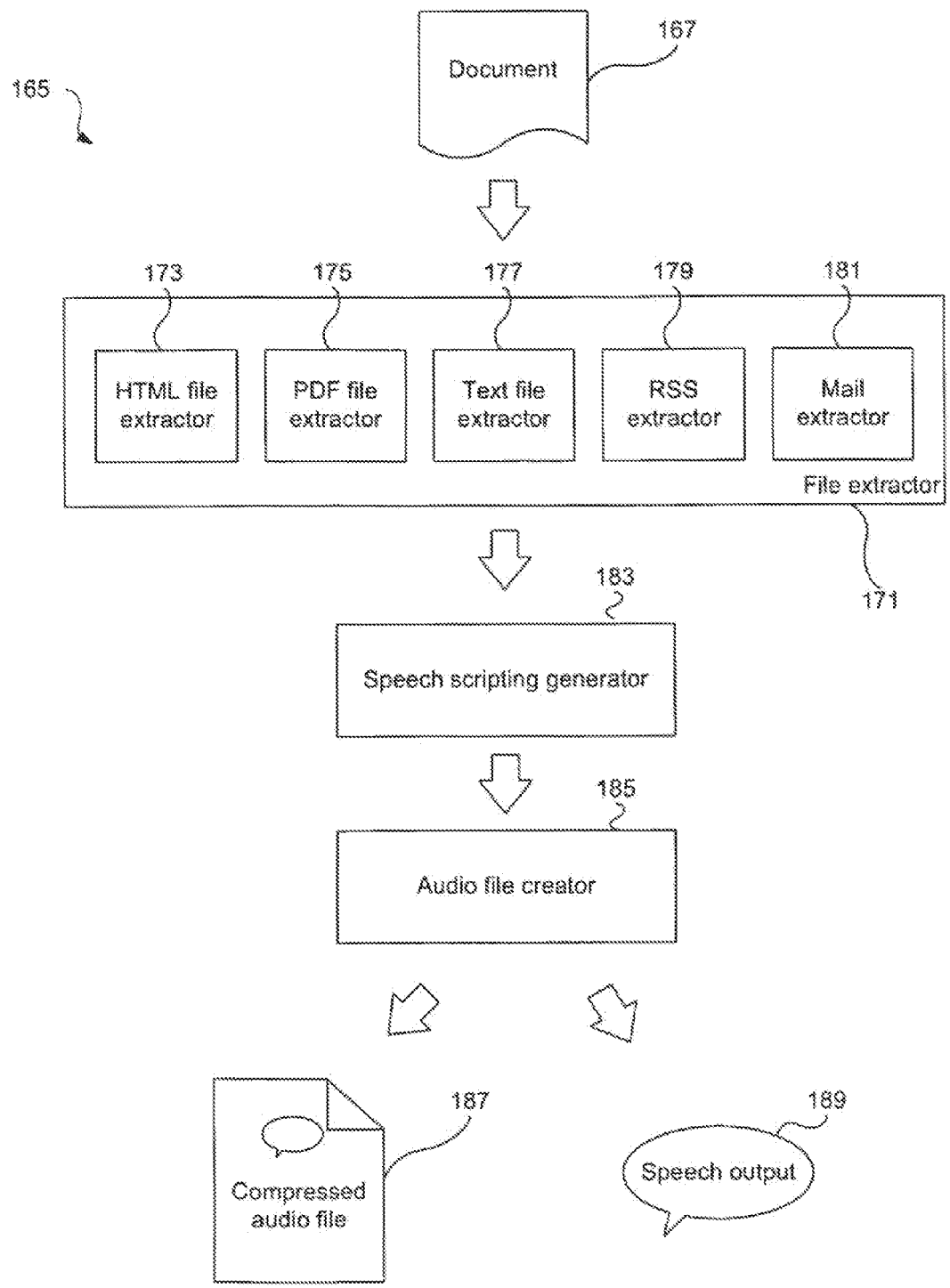
FIG. 1(c) is a block diagram of a text-to-speech processing system according to another embodiment of the invention.

In the above description, such as illustrated in FIG. 1(*b*), the document text-to-speech analyzer 151 and the text-to-speech processor 157 are shown as separate from each other. However, the text-to-speech analyzer 151 and text-to-speech processor 157 need not be separate. Further, the text-to-speech processing script 153 is also not required in other embodiments. Thus, in one embodiment, a single software application combining the functions of the text-to-speech analyzer 151 and the text-to-speech processor 157 can process a document 153 and output audio, either as speech output 161 (e.g., reading the document to the user on demand) or as an audio file 159 for later playback.

FIG. 1(*c*) is a block diagram of a text-to-speech processing system 165 according to one embodiment of the invention. The text-to-speech processing system 165 can receive a document 167 at a file extractor 171 that can be used to retrieve and/or examine (i.e., open) the document 167. The file extractor 171 can include a variety of modules capable of processing different types of documents 167. For example, a file extractor 171 can include an HTML file extractor 173, a PDF file extractor 175, a text file extractor 177, and RSS extractor 179, and an e-mail extractor 181, as well as other modules for extracting other types of documents (Microsoft Word files, RTF files, etc.) The file extractor 171 can output the contents (including at least text) of an extracted file to a speech scripting generator 183. The speech scripting generator 183 can take text that has been extracted by a file extractor 171 and apply heuristics (e.g., rules) to markup the text with speech markup tags. The speech markup tags can indicate when different speech attributes (e.g., the speed to read text, the voice used, or the pitch of the voice used) are to be applied.

The speech scripting generator 183 can output instructions (i.e., a script) to an audio file creator 185 which can be used to create an audio file based on the script supplied by the speech scripting generator 183 as well as the speech of the extracted text. For example, the audio file creator 185 can incorporate a text-to-speech processor and a sound recording application, where the output of the text-to-speech processor is recorded and stored as an audio file. The audio file creator 185 can output a compressed audio file 187, for example an MP3 or AAC file. Alternately, the audio file creator 185 can output an uncompressed audio file, for example an AIFF or WAV file. In an alternate embodiment, the audio file creator 185 can output speech to present to a listener, for example by using an audio output device 117 as described above in reference to FIG. 1(*a*), instead of generating a compressed audio file 187.

Figure 2:
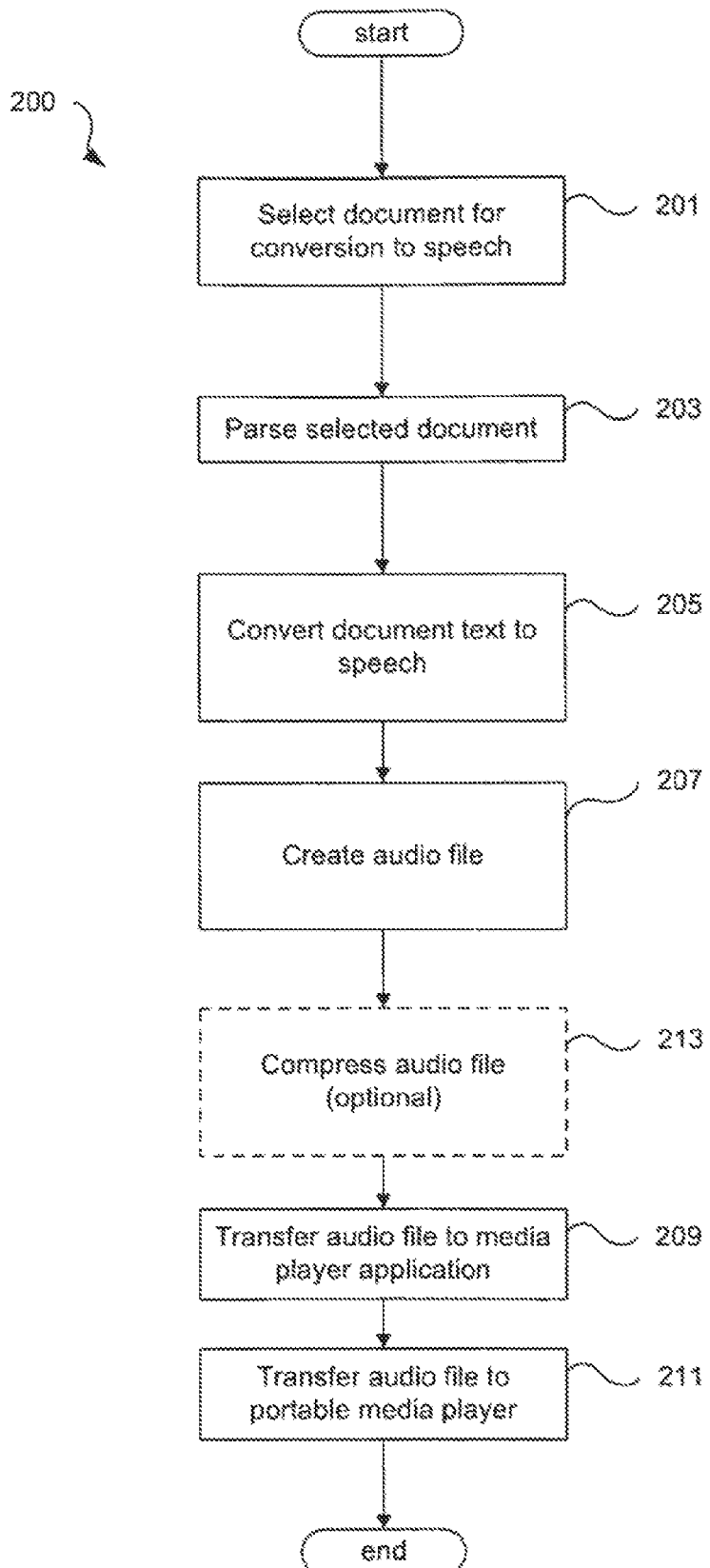
FIG. 2 is a flow diagram of a document to audio file conversion process according to one embodiment of the invention.

FIG. 2 is a flow diagram of an audio file creation process 200 according to one embodiment of the invention. The audio file creation process 200 can be implemented using, for example, the text-to-speech processing system 100 of FIG. 1(*a*), the text-to-speech processing system 150 of FIG. 1(*b*), or the text-to-speech processing system 165 of FIG. 1(*c*).

The audio file creation process 200 begins by selecting 201 a document for conversion into an audio file. A document can be any electronic file or link that contains text. For example, the document can be a text file, a PDF file, a webpage, a hyperlink, an RSS feed, or an e-mail. Text files can be of any format, for example: plain text, RTF or other proprietary file formats generated by common word processing software; files formatted using a page description language such as a PostScript or PDF; files formatted using a markup language such as HTML or XML; or files formatted using a typesetting program such as TeX. The audio file creation process 200 continues by parsing 203 the selected document. Parsing 203 can involve examining, interpreting and/or identifying all the various elements of the selected document. For example, parsing 203 can be used to identify the various text elements in the selected document, including, but not limited to, author information, document title, header text, footer text, body text, table captions, picture captions, abstract text, footnotes, endnotes, table of contents, hyperlinks, and copyright information. In addition, parsing 203 can involve identifying supplemental elements that may be present in the selected document. Examples of supplemental elements are markup tags, typesetting information, binary code, embedded video, pictures, proprietary content such as Flash or QuickTime, and metadata. In one embodiment, when hyperlinks are present, one or more hyperlinks can be opened and resolved during the parsing 203 of the selected document. For example, if the selected document is an RSS feed, the parsing 203 can resolve a RSS URL for the RSS feed, and examine the text or webpage associated with the RSS URL. As another example, if the selected document pertains to e-mail, parsing 203 can include retrieving e-mails from a server.

Once the document has been parsed 203, the document text is converted 205 to speech consistent with the document parsing 203 using a text-to-speech processor, for example the text-to-speech processor 107 of FIG. 1(b). Different types of text elements can be converted to speech differently, using different speech cadence, inflection, or tone, or by indicating different types of text using auditory cues. The audio file creation process 200 continues by creating 207 an audio file using the speech created by the text-to-speech conversion of step 205, for example, by recording (i.e., storing) the output of the text-to-speech processor. Alternately, a text-to-speech processor can create 207 an audio file directly.

Next, the audio file can be transferred 209 to a media player application. In the case where the audio file is transferred to a media player application, the media player application can be a media management application for example iTunes™ software program, produced by Apple Inc. of Cupertino, Calif. Finally, the audio file can be transferred 211 to a portable media player, for example by performing a synching operation between the portable media player, (e.g., an iPod™ or other portable media player), and a personal computer. The transfer 211 of the audio file to the portable media player can be managed using the media management application. Alternately, the audio file can be transferred 211 to a media player application directly, without first performing step 209.

In one embodiment, the audio file can be compressed 213 before being transferred 209 to the media player application. Compression may be necessary because many standard audio files are created using "lossless" recording algorithms, which typically produce files that require a large amount of memory storage space. For example, in the audio interchange file format (.aiff), one minute of audio can require 10 MB or more of storage space. Thus, it is common to compress audio, for example, into a "lossy" file format, such as MP3 or AAC, which take up much less memory storage space. Alternately, in one embodiment, a compressed audio file can be created in step 207, thus eliminating the need for compression step 213.

Figure 3:
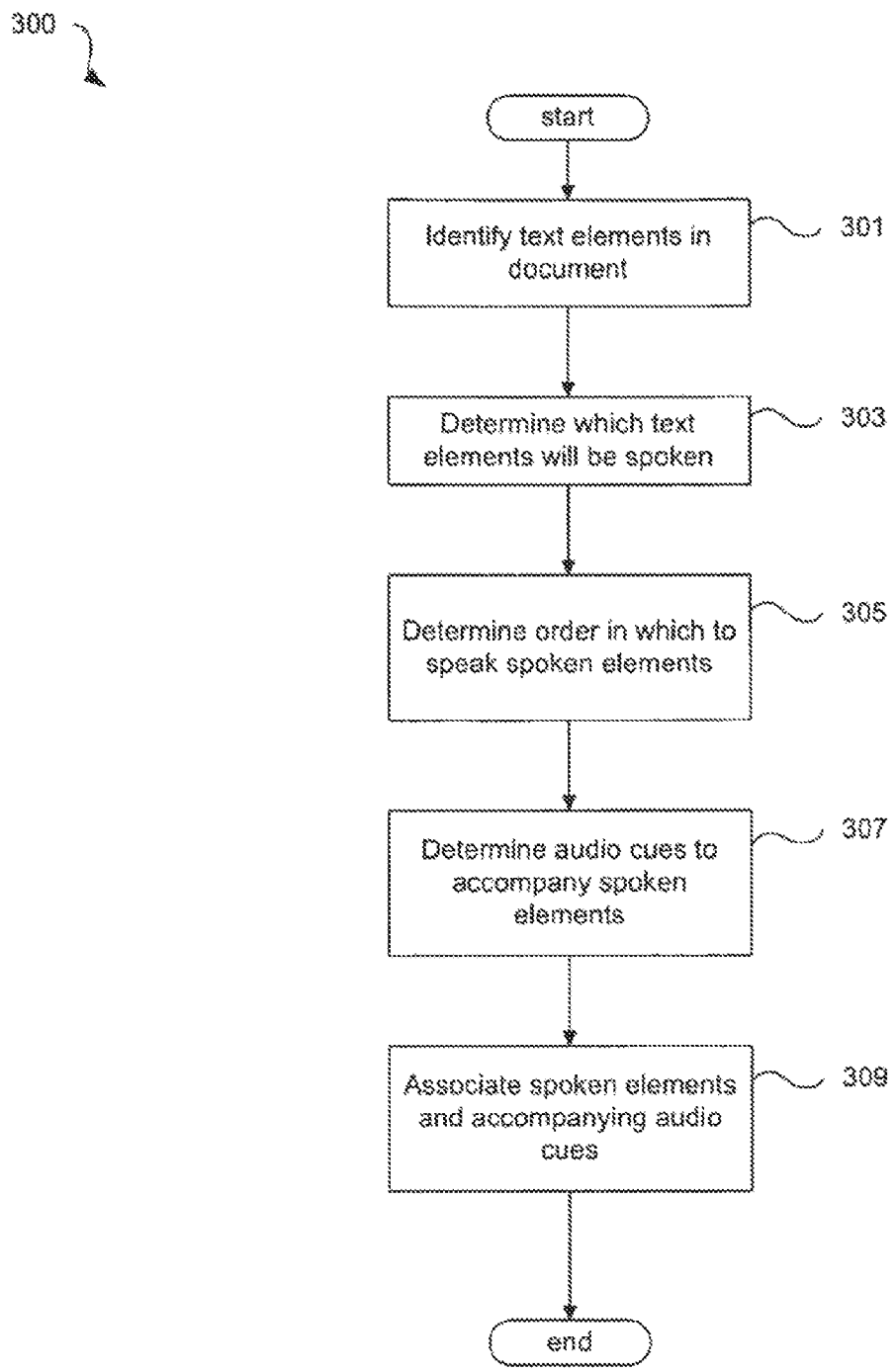
FIG. 3 is a flow diagram of a text-to-speech processing process according to one embodiment of the invention.

FIG. 3 is a flow diagram of a text-to-speech processing process 300 according to one embodiment of the invention. The text-to-speech processing process 300 can replace and/or supplement the parsing step 203 and the text-to-speech conversion step 205 of FIG. 2.

The text to speech processing process 300 begins by identifying 301 text elements in a given document. The identifying 301 of text elements in a document can include, for example, parsing the document as described in block 203 of FIG. 2. Other elements in the document, such as supplemental elements, including pictures, embedded video, markup language tags, and metadata, can also be identified 301. The supplemental elements may also include text that is not normally presented to a reader when the document is displayed, such as copyright information or document revision information.

Figure 4:
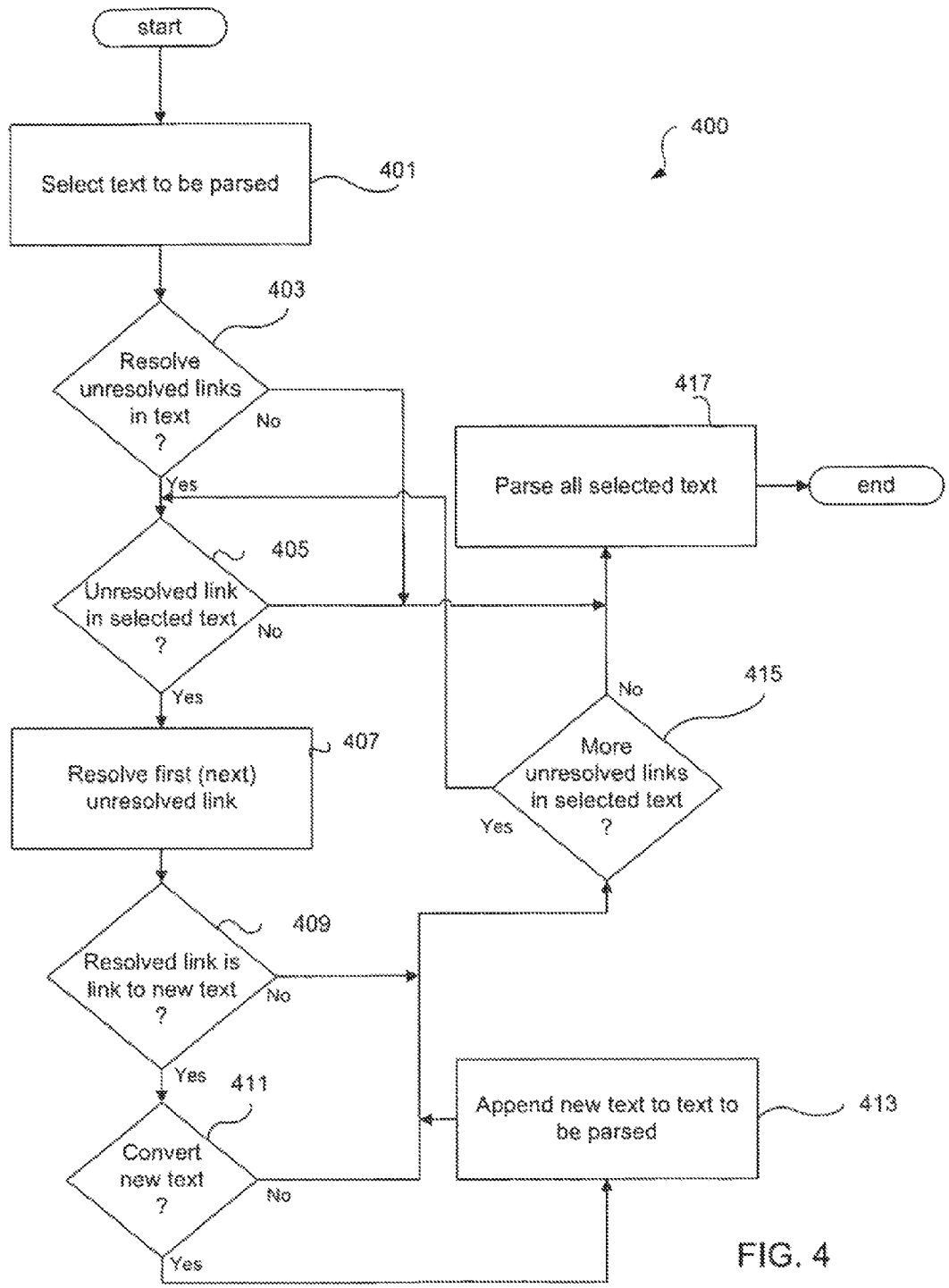
FIG. 4 is a flow diagram of a text-parsing process according to one embodiment of the invention.

Next, the text-to-speech processing process 300 determines 303 which text elements will be spoken. Examples of text elements that can be spoken include, but are not limited to, titles, body text, footnotes, picture captions, table captions, and page numbers. Examples of text elements that might not be spoken include markup tags, tables of contents, and other text elements that may be difficult to convert to speech. Those particular text elements that are not to be spoken can be designated as non-spoken text elements during the determination 303. FIG. 4, as discussed below, is a flow diagram of a text-parsing process 400 according to one embodiment of the invention.

The text to speech processing process 300 continues by determining 305 the order in which to speak spoken elements. For example, the text-to-speech processing process 300 can determine 305 that footnotes contained in a document are to be spoken in line (i.e., spoken as they occur in the document). Other examples of text elements that may be spoken in a different order than they occur in the text document include page numbers, which can be spoken at the beginning of the page rather than at the end, author information, and endnotes. Next, audio cues that will accompany spoken elements can be determined 307. Audio cues include audio contextual cues that are presented to the listener in order to better convey the content of a particular document. As noted above, audio contextual cues can be as simple as announcing the context of a particular block of text, for example by saying "this is a title", "this is a footnote", etc. Audio contextual cues for the content of a document can also be imparted, for example, by altering the speed of the text as it is read, changing the voice used by the text-to-speech processor, playing a sound to announce a contextual change, speaking the text while a background noise is played, or altering the volume of the voice speaking the text.

Next, the spoken elements as determined in step 303 are associated 309 with the audio cues that were determined in step 307. The association 309 of the spoken elements and the audio clues can produce a tagged document or a speech script for use with a document.

In one embodiment, the invention can process hyperlinks in a document in an intelligent manner. In one implementation, when a block of text includes a hyperlink, a text-to-speech processor can indicate (e.g., by auditory cue) to the user that a string of text (possibly a word or phrase) is a hyperlink. As one example, a low tone in the background can be played while a text-to-speech processor speaks the hyperlink. As another example, a tone or click can be played before and/or after the hyperlink. As still another example, a text-to-speech processor can use a distinct voice to let the user know that text being read is a hyperlink. Besides auditory cues for denoting hyperlinks, hyperlinks can point to other documents and such other documents can be processed for text-to-speech and/or audio cues.

FIG. 4 is a flow diagram of a text-parsing process 400 according to one embodiment of the invention. The text-parsing process 490 can be used to resolve links (e.g., hyperlinks) in a document. For example, the text-parsing process 400 can be performed by the text-to-speech analyzer 151 of FIG. 1(b).

The text-parsing process 400 begins by selecting 401 text within an electronic document to be parsed. Next, a determination 403 determines if links (e.g., hyperlinks) in the selected text are to be resolved. For example, if a user can indicate (e.g., with a preference setting) whether links are to be resolved. Resolving a link can involve following the link to another document, following the link to another place on the same document, or simply determining where the link leads. In some cases, such as when the document being processed is a webpage, it may be undesirable to follow all links, since webpages sometimes contain numerous links. In other cases, it may be desirable to resolve one or more links in-line, such as when the webpage contains footnotes. Alternatively, the text-parsing process 400 may simply determine that a document contains one or more links without resolving any of the links. Thus the determination 403 can be used to determine which, if any, links are to be resolved in a particular document or block of text.

If the decision 403 determines that unresolved links are not to be resolved, the selected text is parsed 417 and the parsing process 400 ends. Parsing 417 can be, for example, the parsing 203 as described in reference to FIG. 2. On the other hand, if determination 403 determines that one or more unresolved links are to be resolved, then the text-parsing process 400 continues to decision 405 which determines if there are unresolved links in the selected text. If decision 405 determines that there are no unresolved links in the selected block of text, then the selected text is parsed 417 and the text-parsing process 400 ends. Alternatively, if decision 405 determines that there are unresolved links in the selected text, then the first unresolved link is resolved 407. Next, a decision 409 determines if the link that has been resolved 407 is a link to new text, such as a link to a footnote or a new document. If decision 409 determines that the resolved link is not a link to new text, for example if the link is a link (e.g., a bookmark) to a different section of the same document, then the text-parsing process 400 proceeds to decision 415. On the other hand, if decision 409 determines that the resolved link is a link to new text, a decision 411 determines if the new text is to be converted. In the case wherein the new link is a link to a new document, for example a different webpage, decision 411 can determine that the new text is not to be converted. Alternatively, in the case where the new link is a link to a footnote, decision 411 can determine that the text is to be converted. The decision of whether to convert a particular block of text can be, for example, predetermined by a user (i.e., by setting a preference setting) or predetermined by the designer of the program used to parse the document (i.e., set by default in a program). If decision 411 determines that the new text is to be converted, the new text is appended 413 to the text that was previously selected 401 to be parsed. At this point in the text-parsing process 400, the text that will eventually be parsed in step 417 includes the original text selected 401 and the new text appended 413.

Following block 413, following the decision 409 if the resolved link is not a link to new test, or following the decision 411 if the new text is not to be converted, a decision 415 determines if there are more unresolved links in the selected text. If decision 415 determines that there are more unresolved links, the text-parsing process 400 continues to decision 405 and subsequent blocks. If decision 415 determines that there are no more unresolved links, the text-parsing process 400 continues to block 417 where the selected text together with any appended new test can be parsed. Following block 417, the text-parsing process 400 can end.

In one embodiment of the invention, in the case where the new link is a link to a new document, the new document can be converted and stored as a separate audio file. Furthermore, links between one or more audio files created by, for example, the text-to-speech processing system of FIG. 1(b) can be inserted as chapter or section markers in the audio files. Later, when a user listening to an audio file created by a text-to-speech processor is notified (e.g., by an audio cue) that a hyperlink or link to another document has been reached, that user could, if desired, skip forward to that document.

Figure 5:
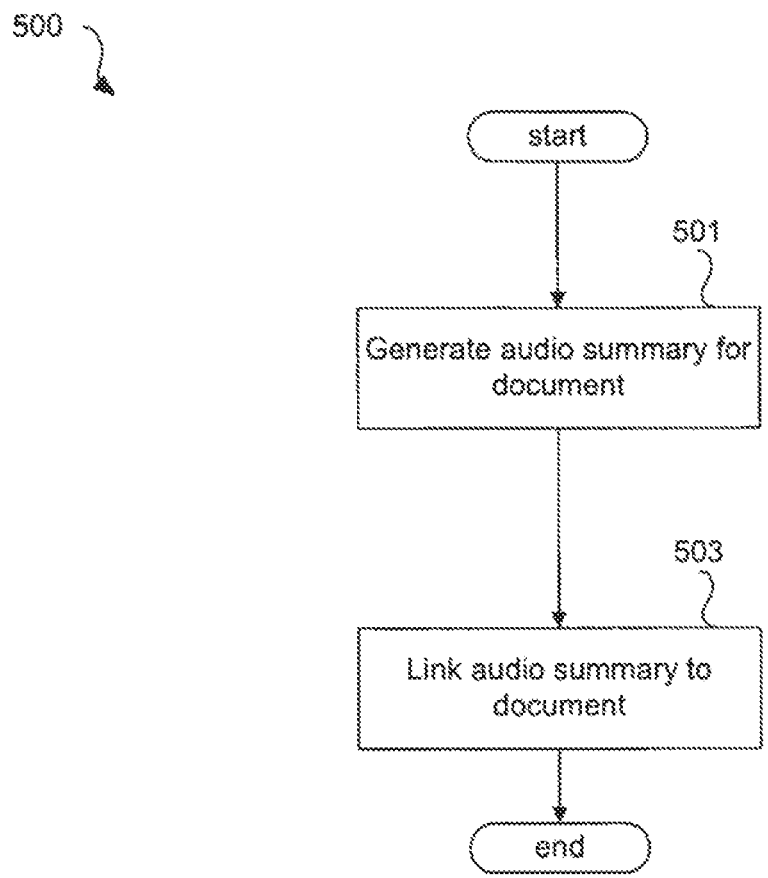
FIG. 5 is a flow diagram of an audio summary generating process according to one embodiment of the invention.

FIG. 5 is a flow diagram of an audio summary generating process 500 according to one embodiment of the invention. The audio summary generating process 500 can be used to create an audio summary for a file. The resulting audio summary can be accessed without opening the file. In one embodiment, the audio summary is implemented as "audio metadata", whereby metadata that is incorporated into a file is converted into speech. For example, many audio files, such as MP3 files or AAC files, contain metadata (i.e., data and that describes the data contained in the file). The audio summary generating process 500 can be used to convert the metadata contained in the MP3 or AAC file into an audio format (i.e., audio metadata) using a text-to-speech processor. One advantage of converting metadata into audio metadata is that a user can determine the contents of a file without having to look at or open that file.

The audio summary generating process 500 can begin by generating 501 an audio summary for a document. As examples, the document can be a music file, a text document, or a webpage. In the case of a music file, the generating of an audio summary can involve examining the metadata of the music file (typically contained in the file headers) and converting some or all of the metadata to audio. In the case of a text file, the generating 501 of the audio summary can include parsing the document to determine the author and title of the document. Further, in the case of the text file, the generating 501 of the audio summary can include identifying abstract or summary text and including audio for such text in the audio summary. In the case of a webpage, a generating 501 of the audio summary can include parsing the webpage for metadata, identifying title, author and/or abstract information for the webpage.

E-mail and RSS feeds typically include text and thus can also be considered documents. In the case of e-mail, the generating of the audio summary can include summarizing the contents of an e-mail inbox. For example, if an e-mail inbox contains five messages, the audio summary generating process can parse the headers of the five e-mails and compose a summary of the authors and subjects of the e-mails. Similarly, in the case of an RSS feed, the audio summary generating process can generate 501 a summary of the sources and subjects of new or updated RSS feeds.

In any event, after the audio summary is generated 501, the audio summary generating process 500 can link 503 the audio summary to the document. The linking 503 of the audio summary to the document can include, for example, embedding the audio summary into a header of a file containing the document. Alternately, the linking 503 of the audio summary to the document can store the audio summary in a directory associated with the document and provide a pointer (i.e., a software pointer) to the document.

Figure 6:
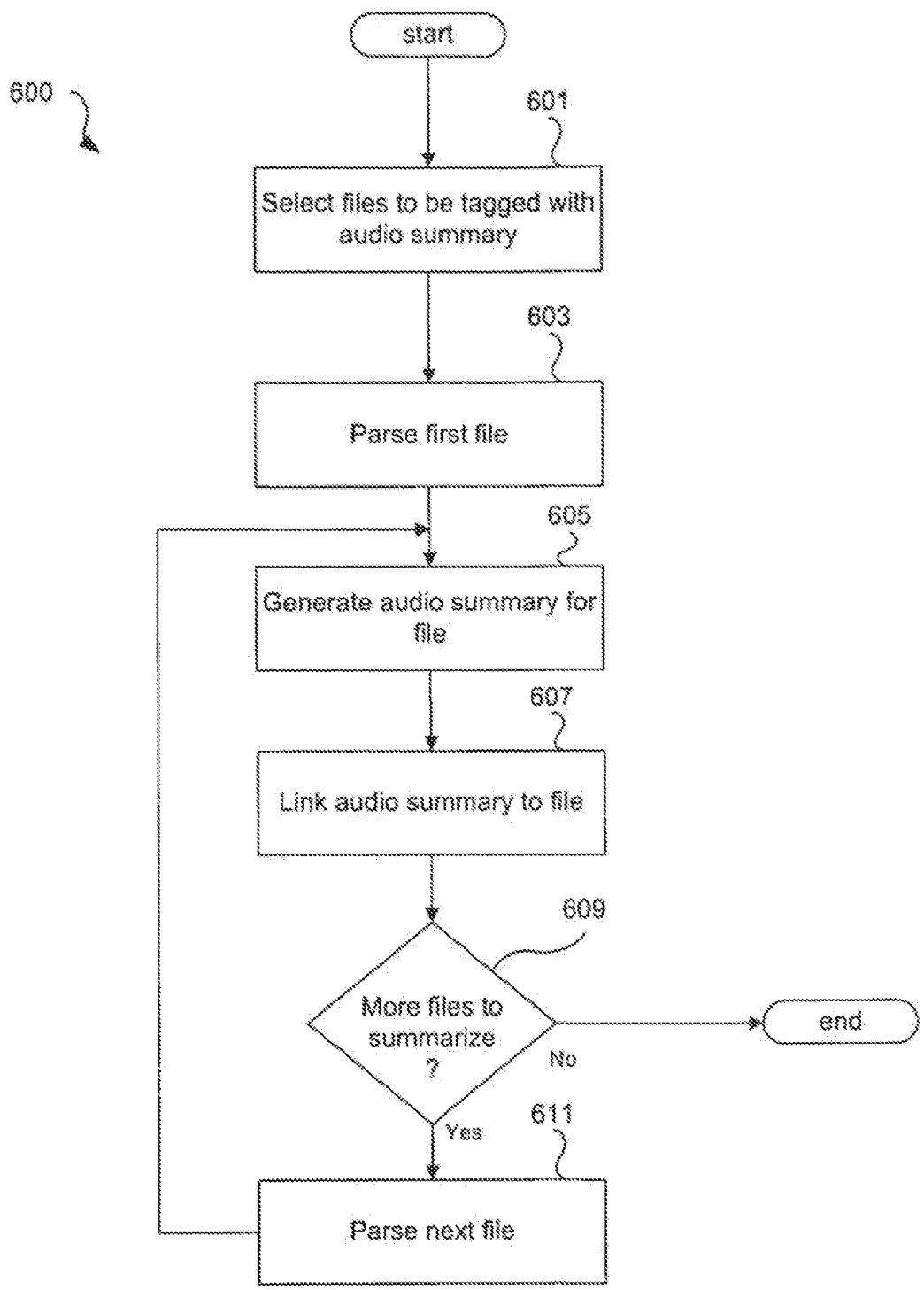
FIG. 6 is a flow diagram of an audio summary file-tagging process according to one embodiment of the invention.

FIG. 6 is a flow diagram of an audio summary file tagging process 600 according to one embodiment of the invention. The audio summary file tagging process 600 can be used to tag or more files with audio summary data. The audio summary file tagging process 600 can be performed as a batch operation, for example, on a folder of files, an e-mail inbox, a collection of RSS feeds, or on an entire directory tree. In one implementation, the audio summary file tagging process 600 can occur during, for example, the generation 501 of an audio summary for a document as described above in reference to FIG. 5.

The audio summary file tagging process 600 begins by selecting 601 one or more files to be tagged with an audio summary. As mentioned above, the selection 601 of one or more files can include files within a folder or directory. Next, a first file is parsed 603. The file can be parsed 603, for example, using a text-to-speech analyzer 151 as described in FIG. 1(b). After the file is parsed 603, an audio summary for the file is generated 605. The audio summary can be generated 605, for example, as described above with reference to FIG. 5. After generating 605 the audio summary for the file, the audio summary file tagging process 600 continues by linking 607 the audio summary to the file. The linking 607 can be accomplished, for example as described above in reference to FIG. 5. Next, a decision 609 that determines if more files have been selected to summarize, such as in the case where multiple files have been selected to be tagged with audio summaries. If decision 609 determines that there are more files to summarize, then the audio summary file tagging process 600 continues to parse 611 a next selected file. After the next selected file is parsed 611, the audio summary file tagging process returns to repeat block 605 and subsequent blocks to produce the audio summary for the selected file. On the other hand, if decision 609 determines that there are no more files to summarize, then the audio summary file tagging process 600 ends.

In one embodiment, when a user selects a file (i.e., clicks on the file using a mouse) that contains an audio summary, a text-to-speech processor, for example the text-to-speech conversion application 103 of FIG. 1(a), presents an audio summary of the selected file. In another embodiment, when a user mouses over (i.e., manipulates a mouse to place a cursor over) a file, a text-to-speech processor presents the audio summary of the file that has been moused over. In a third embodiment, selecting or mousing over a file or document causes a media player application to play an audio summary associated with the selected document or file. In still another embodiment, a portable media player incorporates the capability to present an audio summary of a file when a user selects the file, for example, by using the user interface of the portable media player. In one embodiment, the audio summary can be generated on a personal computer and transferred to a portable media player for later presentation by the portable media player. In another embodiment, the audio summary can be presented using a text-to-speech processor operating on the portable media player.

Figure 7:
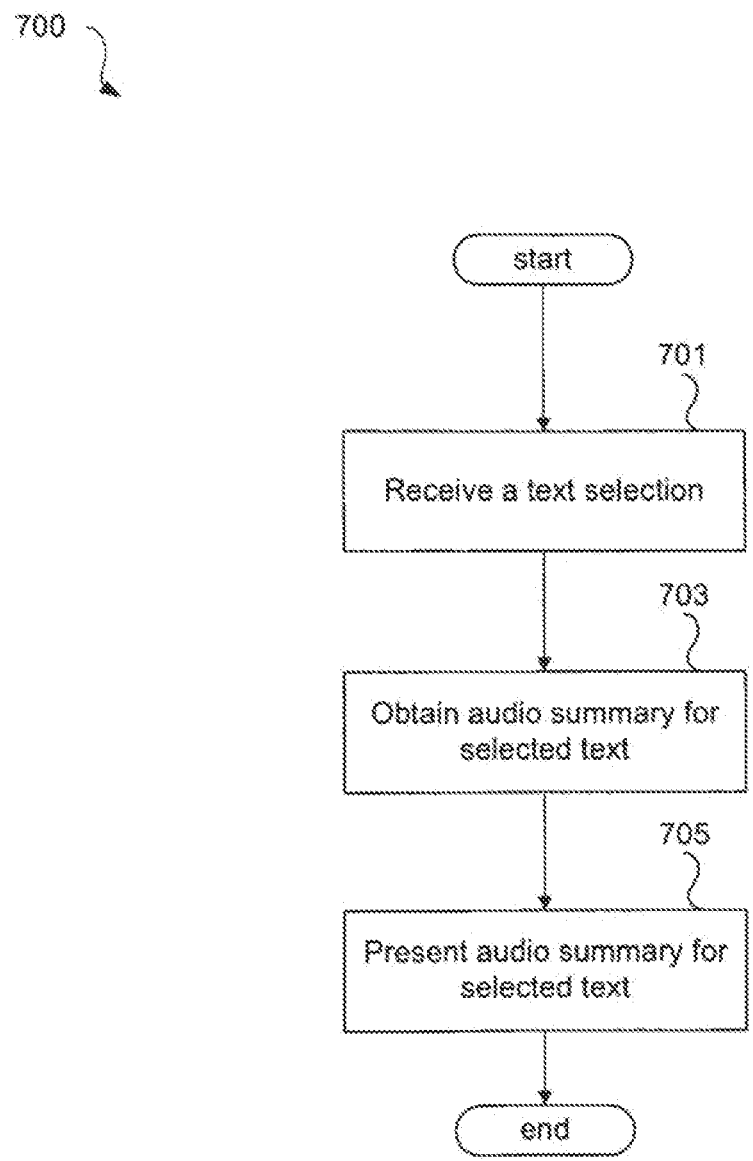
FIG. 7 is a flow diagram of an audio summary presentation process according to one embodiment of the invention.

FIG. 7 is a flow diagram of an audio summary presentation process 700 according to one embodiment of the invention. The audio summary presentation process 700 can be implemented by, for example, the host computer 101 of FIG. 1(a). Alternately, or in addition, the audio summary presentation process 700 can be implemented by the portable media player 121 of FIG. 1(a).

The audio summary presentation process 700 begins by receiving 701 a selection of text (e.g., document) to be summarized. In the case of a webpage, entering the webpage URL into a network browser can operate to select text to be summarized. In the case of a document or file, clicking or mousing over a file can operate to select text from an associated document. In the case of an e-mail application, opening an e-mail inbox can operate to select text of e-mails in the e-mail inbox. Similarly, in the case of an RSS reader, navigating to or opening a RSS reader application can operate to select text from one or more of the RSS feeds available to the RSS reader. Next, the audio summary presentation process obtains 703 an audio summary for the selected text. The audio summary can be created or, if already created and stored, the audio summary can be retrieved. Finally, the audio summary for the selected text is presented 705 to the user. For example, the host computer 101 or the portable media player 121 can play the audio summary for a user.

Figure 8:
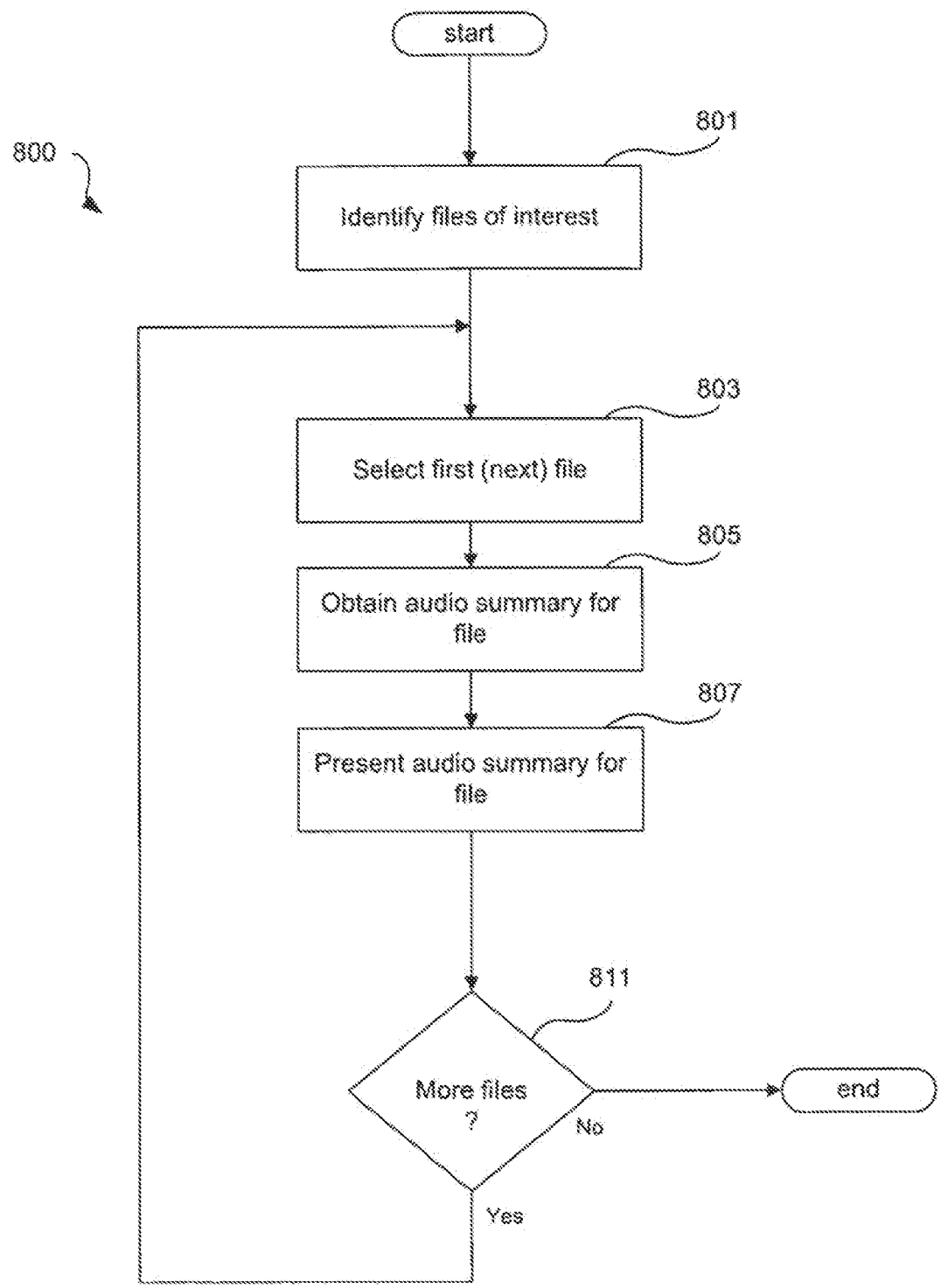
FIG. 8 is a flow diagram of an audio summary presentation process according to one embodiment of the invention.

FIG. 8 is a flow diagram of an audio summary presentation process 800 according to one embodiment of the invention. The audio summary presentation process 800 can be used to apply the audio summary presentation process 700 of FIG. 7 to a group of files or documents. The audio summary presentation process 800 can be implemented by, for example, the host computer 101 of FIG. 1(a). Alternatively, or in addition, the audio summary presentation process 800 can be implemented by the portable media player 121 of FIG. 1(a).

The audio summary presentation process 800 begins by identifying 801 files of interest. The files of interest can pertain to text or documents of interest. For example, the identifying 801 can be initiated by selecting a folder or directory of files or navigating to a website. Next, a first file of interest is selected 803. After selecting 803 the file, an audio summary is obtained 805 for the selected file. The audio summary can be obtained 805 from memory or can be generated. Next, the audio summary is presented 807 for the selected file.

After presenting 807 the audio summary for the selected file, a decision 811 determines if more files to be processed to provide audio summaries are. Here, the decision 811 can be based on the files of interest identified in step 801. If there are more files to be processed, the audio summary presentation process 800 returns to block 803 where a next file can be selected and then similarly processed. On the other hand, if there are no more files to be processed, then the audio summary presentation process 800 ends.

In one embodiment, when a user selects a file (i.e., clicks on a file using a mouse) a directory that contains one or more audio summaries, a text-to-speech processor, for example the text-to-speech conversion application 103 of FIG. 1(a), presents an audio summary of the selected file. In another embodiment, the audio summary presentation process 800 can be used to create an audio summary of one or more files, e-mails, RSS feeds, etc., create an audio file of the audio summary, and later transfer the audio file of the audio summary to a portable media player for playback at the user's convenience. In this embodiment, the audio summary of the one or more files can be a separate audio file from the audio files that it summarizes. For example, in the case of an e-mail inbox, an audio summary can be made describing the contents of the user's inbox. In addition, each individual e-mail can be converted to audio and stored in one or more separate files. Alternatively, a single audio file can be created containing chapters, wherein one chapter contains an audio summary of the contents of the user's e-mail inbox and subsequent chapters contain text-to-speech conversions of the individual e-mails in the user's e-mail inbox.

It is noted that audio summaries can be embedded or linked to documents by any of the above processes at any stage of file creation or after files have been created. For example, an audio summary can be embedded into a webpage by the creator of the webpage. In another example, an audio summary can be embedded in a document (e.g., as metadata) upon creation of the document by the author of the document. Thus, in the case where a user purchases a media file on an online store, the producer of the media file may have already embedded an audio summary and/or audio metadata into the file.

Figure 9A:
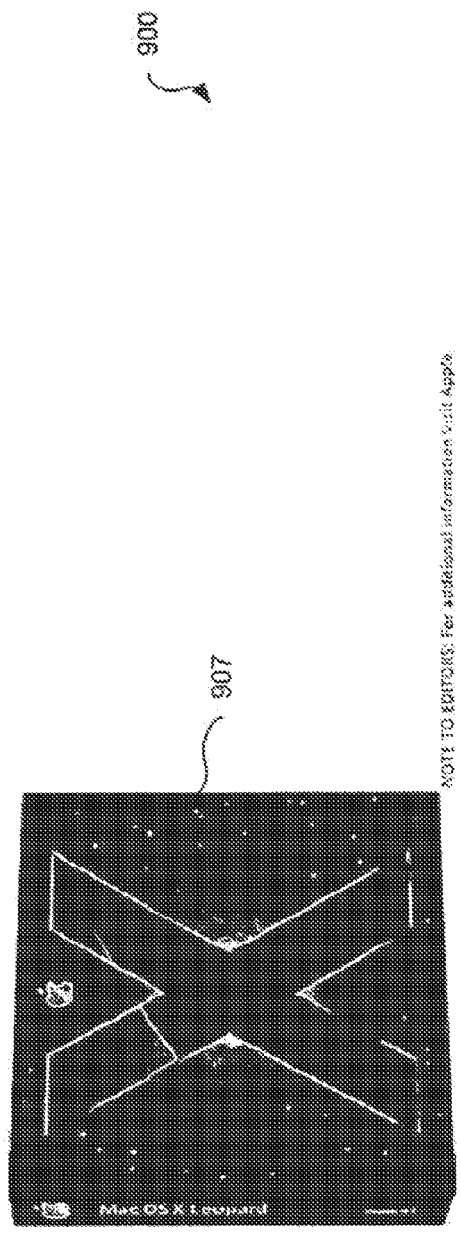
FIG. 9(a) is a screenshot of an exemplary text document.

FIG. 9(a) is a screenshot of an exemplary document 900. The exemplary document 900 is a document that contains not only text but also a footnote 901, a quote 903, a hyperlink 905 and an image 907. The document also varies text sizes and has punctuation and formatting. The document 900 can be a webpage, a PDF document, or any other document type that can contain not only text but also specific components such as footnotes, quotes, hyperlinks and images.

Figure 9B:
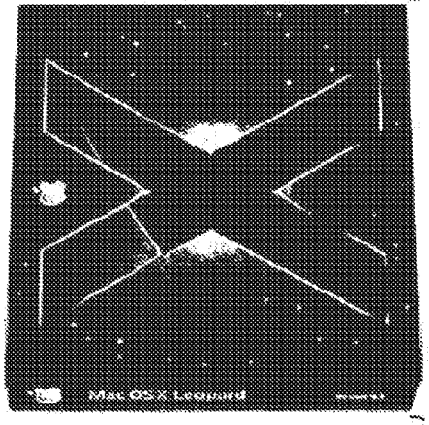
FIG. 9(b) is a screenshot of an exemplary marked up text document that has been prepared for conversion to speech.

FIG. 9(b) is a screenshot of an exemplary marked up document 950 that has been prepared for conversion to speech. The exemplary marked up text document 950 can represent the exemplary document 900 of FIG. 9(a) after it has been marked up with instructions for subsequent spoken presentation by a voice synthesizer (e.g., a computerized voice used by a text-to-speech program to speak text.) The instructions embedded in the exemplary marked up text document 950 can be regarded as instructions corresponding to one implementation of a text-to-speech markup language described above in reference to FIG. 1(b) above. Further, exemplary text marked up document 950 can be regarded as an example of a text-to-speech processing script created by the text-to-speech analyzer 151 of FIG. 1(b). In the exemplary marked up text document 950, pauses can indicate punctuation, for example a voice synthesizer can insert long pause 951 to indicate two new lines, a short pause 953 to indicate a dash, a short pause 963 to indicate a font style change, and a long pause 967 to indicate extended punctuation, in this case a long string of asterisks. Long and short pauses can have different durations as set, for example, by a user preference. The exemplary marked up text document 950 also includes markup indicating changes in the speed at which the text-to-voice synthesizer will speak text. Rate increase 955 indicates parenthetical text. Rate increase 957 indicates a footnote. Rate decrease 965 indicates a link (e.g., hyperlink). The rate at which text is spoken can be set by the user as a user preference. The exemplary marked up text document 950 also includes voice synthesizer voice selections. Voice selection 959 indicates a male voice, designated Steve, will be used to speak the text contained in quotes. Voice selection 961 indicates that a voice, designated narrator, will be used to speak the text. Any number of different voices may be available, depending on the speech synthesizer. Alternatively, the parameters covering the voice produced by the text-to-speech synthesizer (e.g., pitch, speed, tone, accent, inflection, etc.) can be designated in the document, allowing for the creation of custom voices for a particular document. The exemplary marked up text document 950 also includes markup that directs text-to-speech processor to play sounds at particular times during the speaking of a document. In the exemplary marked up document 950, a command to play a sound 973 is used to indicate a link in the document, while a command to play a sound 969 is used to indicate an image in the document. The exemplary marked up text document 950 also depicts that the footnote text 971 is spoken inline where it is first referenced in the document and is not re-spoken at the end of the page.

The advantages of the invention are numerous. Different aspects, embodiments or implementations may, but need not, yield one or more of the following advantages. One advantage of certain embodiments of the invention is that improved quality of text-to-speech processing and improved identification of documents can be provided through the use of audio metadata. Another advantage of certain embodiments of the invention is that pauses, voice changes, and other audio cues can be presented to a user, thus improving the user experience when listening to text-to-speech output. This improved user experience when listening to text-to-speech output can be especially beneficial to a visually impaired listener, who can gain a fuller and more comprehensive understanding of a document's structure, format and content. Another advantage of certain embodiments of the invention is that audio summaries can for documents can be produced and presented. Another advantage of certain embodiments of the invention is that use of text-to-speech processing scripts allows separation of text-to-speech presentation software from text-to-speech processing software, which can reduce the need for complex text-to-speech processing applications on device providing speech presentation. For example, a device with minimal processing power can run a simple text-to-speech engine that follows a text-to-speech script that has been prepared on a more powerful device rather than having to perform the text-to-speech processing itself.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for converting text to speech, the method comprising:
　at an electronic device with a processor and memory storing one or more programs for execution by the processor:
　　parsing a document to identify a plurality of text elements in the document to be converted to speech, wherein in the document, a first text element of the plurality of text elements is positioned before a second text element of the plurality of text elements;
　　determining, by the processor, an order in which the plurality of text elements are to be spoken, wherein the determined order comprises speaking the second text element before the first text element; and
　　converting the plurality of text elements to speech, wherein the speech is spoken in the determined order.

2. The method of claim 1, wherein the second text element includes at least a portion of a footnote of the document.

3. The method of claim 1, wherein the second text element includes a page number of the document.

4. The method of claim 1, wherein the first text element includes at least a portion of a table of contents of the document.

5. The method of claim 1, further comprising:
　generating a text-to-speech processing script after determining the order, wherein the text-to-speech processing script includes the first text element and the second text element, and wherein the text-to-speech processing script further includes an annotation disposed before the first text element to indicate that the second text element is to be spoken before the first text element.

6. The method of claim 5, wherein the text-to-speech processing script further includes a second annotation at the second text element to indicate that the second text element is not to be re-spoken.

7. The method of claim 1, wherein the document includes a plurality of embedded text-to-speech markup tags that were inserted during creation of the document, and wherein the plurality of text elements are identified based on the plurality of text-to-speech markup tags.

8. A method for converting text to speech, the method comprising:
    at an electronic device with a processor and memory storing one or more programs for execution by the processor:
        parsing a document to identify a subset of text to be converted to speech, the subset of text having a context;
        creating an announcement comprising a spoken description of the context;
        determining, by the processor, an order in which the announcement and a spoken form of the subset of text are to be spoken, wherein the determined order comprises speaking the announcement prior to the spoken form of the subset of text; and
        generating audio that includes the spoken form of the subset of text and the announcement, wherein the announcement is spoken prior to the spoken form of the subset of text.

9. The method of claim 8, wherein the context is a footnote.

10. The method of claim 8, wherein the context is a title.

11. The method of claim 8, further comprising:
    identifying a second subset of text while parsing the document, the second subset of text having a second context that is different from the context; and
    creating a second announcement comprising a spoken description of the second context;
wherein the generated audio includes a spoken form of the second subset of text and the second announcement, wherein the second announcement is spoken prior to the spoken form of the second subset of text.

12. The method of claim 8, wherein the document does not include text corresponding to the announcement.

13. The method of claim 8, further comprising:
    identifying a non-text element of the document while parsing the document; and
    creating an audio cue that represents the non-text element in the document, wherein the generated audio includes the audio cue.

14. The method of claim 13, wherein the non-text element is an image.

15. The method of claim 13, wherein the non-text element is a hyperlink.

16. The method of claim 8, further comprising:
    generating a text-to-speech processing script that includes the subset of text and the announcement, wherein the text-to-speech processing script is processed to generate the audio.

17. A non-transitory computer-readable storage medium comprising instructions for causing one or more processors to:
    parsing a document to identify a plurality of text elements in the document to be converted to speech, wherein in the document, a first text element of the plurality of text elements is positioned before a second text element of the plurality of text elements;
    determining, by the one or more processors, an order in which the plurality of text elements are to be spoken, wherein the determined order comprises speaking the second text element before the first text element; and
    converting the plurality of text elements to speech, wherein the speech is spoken in the determined order.

18. An electronic device comprising:
    one or more processors;
    memory;
    one or more programs, wherein the one or more programs are stored in the memory and configured to be executed by the one or more processors, the one or more programs including instructions for:
        parsing a document to identify a plurality of text elements in the document to be converted to speech, wherein in the document, a first text element of the plurality of text elements is positioned before a second text element of the plurality of text elements;
        determining, by the one or more processors, an order in which the plurality of text elements are to be spoken, wherein the determined order comprises speaking the second text element before the first text element; and
        converting the plurality of text elements to speech, wherein the speech is spoken in the determined order.

19. The device of claim 18, wherein the second text element includes at least a portion of a footnote of the document.

20. The device of claim 18, wherein the second text element includes a page number of the document.

21. The device of claim 18, wherein the one or more programs further include instructions for:
    generating a text-to-speech processing script after determining the order, wherein the text-to-speech processing script includes the first text element and the second text element, and wherein the text-to-speech processing script further includes an annotation disposed before the first text element to indicate that the second text element is to be spoken before the first text element.

22. An electronic device comprising:
    one or more processors;
    memory;
    one or more programs, wherein the one or more programs are stored in the memory and configured to be executed by the one or more processors, the one or more programs including instructions for:
        parsing a document to identify a subset of text to be converted to speech, the subset of text having a context;
        creating an announcement comprising a spoken description of the context;
        determining, by the one or more processors, an order in which the announcement and a spoken form of the subset of text are to be spoken, wherein the determined order comprises speaking the announcement prior to the spoken form of the subset of text; and
        generating audio that includes the spoken form of the subset of text and the announcement, wherein the announcement is spoken prior to the spoken form of the subset of text.

23. The device of claim 22, wherein the context is a footnote.

24. The device of claim 22, wherein the document does not include text corresponding to the announcement.

25. The device of claim 22, wherein the one or more programs further include instructions for:
    identifying a non-text element of the document while parsing the document; and
    creating an audio cue that represents the non-text element in the document, wherein the generated audio includes the audio cue.

* * * * *